United States Patent
Beaujot

(10) Patent No.: US 12,550,812 B2
(45) Date of Patent: Feb. 17, 2026

(54) ARTICULATING AIR SEEDER CART WITH SKEW CORRECTION

(71) Applicant: SeedMaster Manufacturing Ltd., Emerald Park (CA)

(72) Inventor: Norbert Beaujot, Emerald Park (CA)

(73) Assignee: SEEDMASTER MANUFACTURING LTD., Emerald Park (CA)

(*) Notice: Subject to any disclaimer, the term of this patent is extended or adjusted under 35 U.S.C. 154(b) by 974 days.

(21) Appl. No.: 17/677,430

(22) Filed: Feb. 22, 2022

(65) Prior Publication Data

US 2022/0264790 A1  Aug. 25, 2022

(30) Foreign Application Priority Data

Feb. 23, 2021 (CA) .................. CA 3110050

(51) Int. Cl.
*A01C 7/20* (2006.01)
*A01C 7/08* (2006.01)
*A01C 7/12* (2006.01)

(52) U.S. Cl.
CPC .............. *A01C 7/208* (2013.01); *A01C 7/084* (2013.01); *A01C 7/126* (2013.01)

(58) Field of Classification Search
CPC .. A01C 7/208; A01C 7/20; A01C 7/00; A01C 7/084; A01C 7/081; A01C 7/08; A01C 7/12; A01C 7/126
See application file for complete search history.

(56) References Cited

U.S. PATENT DOCUMENTS

| | | |
|---|---|---|
| 5,601,181 A | 2/1997 | Lindhorst |
| 7,147,241 B2 | 12/2006 | Beaujot et al. |
| 8,453,754 B2 | 6/2013 | Beaujot |
| 8,733,259 B2 | 5/2014 | Beaujot |
| 2010/0229770 A1* | 9/2010 | Hagny .................. A01C 7/20 111/163 |
| 2016/0304300 A1 | 10/2016 | Beaujot et al. |
| 2019/0152714 A1 | 5/2019 | Brechon |

OTHER PUBLICATIONS

Canadian Examination Report dated Mar. 29, 2022 for CA Application No. 3,103,312.

* cited by examiner

*Primary Examiner* — Christopher J. Novosad
(74) *Attorney, Agent, or Firm* — Nixon & Vanderhye P.C.

(57) ABSTRACT

A seeding apparatus includes an implement frame mounted on wheels and a plurality of furrow openers mounted on the implement frame. A primary air seeder cart is pivotally connected about a vertical implement pivot axis to an implement hitch on the implement frame, and an implement pivot limiting system is operative to limit a degree of pivoting of the primary air seeder cart about the implement pivot axis with respect to the implement frame to a selected degree chosen to reduce bending of conduits. A secondary air seeder cart can be pivotally connected to a cart hitch on the primary air seeder cart about a vertical cart pivot axis and an cart pivot limiting system is operative to limit the degree of pivoting of the secondary air seeder cart about the cart pivot axis.

29 Claims, 5 Drawing Sheets

ARTICULATING AIR SEEDER CART WITH SKEW CORRECTION

This application claims priority to Canadian Serial No. 3,110,050 filed Feb. 23, 2021, the entire contents of each of which is hereby incorporated by reference.

This disclosure relates to the field of agricultural air seeding implements and in particular an air seeder cart.

BACKGROUND

Seeding implements typically comprise a plurality of furrow openers mounted on a furrow opener implement. The furrow openers are spaced laterally across the width of the implement in generally parallel opener rows extending perpendicular to the operating travel direction, and with three or four opener rows spaced from the front of the implement to the rear thereof. When the implement is travelling in the operating travel direction with opener rows perpendicular to the operating travel direction the furrows made by the openers are parallel to each other and equally spaced across the width of the implement at the designed furrow spacing.

Uneven forces, such hill sides and uneven soil characteristics, are often exerted on the furrow opener implement which can cause it to skew, or travel at an angle to the operating travel direction rather than perpendicular. These forces are typically constantly changing, and this skewing has the undesirable effect of altering the furrow spacing. U.S. Pat. No. 7,147,241 to Beaujot discloses an implement with rear wheel steering to correct such a skewing condition. U.S. Pat. No. 8,453,754 to the present inventor Beaujot discloses a system of varying the depth of ground penetration on one side of the implement to correct the skewing condition.

Air seeders typically include a furrow opener implement connected to a plurality of tanks holding various agricultural products on an air seeder cart by a plurality of hoses which carry a pressurized air stream entrained with agricultural products. Modern air seeders are often configured to facilitate overlap control and variable rate applications of agricultural products by providing a number of drill sections each supplied by an individual hose, and these systems therefore require an increasing number of hoses connecting the implement and the cart.

The air seeder cart may be towed behind or in front of the furrow opener implement but typically the connection is through a vertical pivot axis, such as provided by a pin, and during operation the implement and cart pivot about the pin during turns and the hoses must bend to follow the turn radius.

It is also known to install one or more of the tanks directly onto the frame of the furrow opener implement. For example where a metering system is configured to meter product into each of a plurality of hoses and where each hose is connected to a single furrow opener, there may be 80 or more hoses coming from the metering system to the furrow opener implement, and mounting the tank on the implement frame removes the need for bending the hoses during turns. Such a metering system is disclosed in U.S. Pat. No. 8,733,259 to the present inventor Beaujot.

A problem with mounting the tank directly on the implement frame is that the weight of the tank varies between a full tank and a nearly empty tank, and the tires supporting the weight of the tank flex to different degrees depending on the weight such that the depth of the furrow openers varies.

SUMMARY OF THE INVENTION

The present disclosure provides a seeding apparatus that overcomes problems in the prior art.

In a first embodiment the present disclosure provides a seeding apparatus comprising an implement frame mounted on wheels for travel in an operating travel direction, and a plurality of furrow openers mounted on the implement frame. A primary air seeder cart is pivotally connected about a substantially vertical implement pivot axis to an implement hitch mounted on the implement frame. An implement pivot limiting system is operative to limit a degree of pivoting of the primary air seeder cart about the implement pivot axis with respect to the implement frame to a selected degree chosen to reduce bending of conduits.

In a second embodiment the present disclosure provides a seeding apparatus comprising an implement frame mounted on wheels for travel in an operating travel direction, and a plurality of furrow openers mounted on the implement frame. A primary air seeder cart is pivotally connected to an implement hitch on the implement frame about a substantially vertical implement pivot axis, and a secondary air seeder cart is pivotally connected to a cart hitch on the primary air seeder cart about a substantially vertical cart pivot axis. An implement pivot limiting system is operative to limit the degree of pivoting of the primary air seeder cart about the implement pivot axis with respect to the implement frame to a selected degree.

The present disclosure provides a skew correction system for a seeding implement that is simple and can be readily adapted to various air seeder carts. The disclosure also provides an articulated air seeder cart with primary and secondary air seeder cart. The apparatus allows a tank with a significant number of seed conduits, such as one for each furrow opener, to be mounted on an air seeder cart close to the implement with little pivotal movement instead of being mounted on the implement frame. The walkways giving access to tanks on both the primary and secondary air seeder carts are accessible from a single ladder, reducing effort for the operator.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
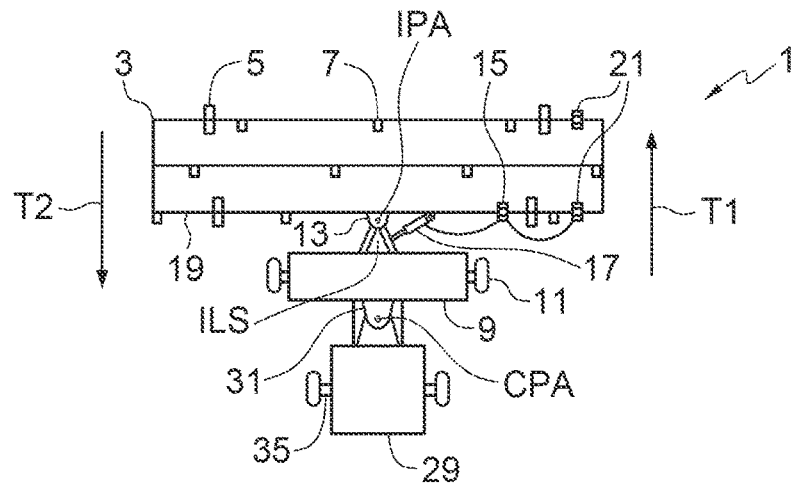
FIG. 1 is a schematic top view of an embodiment of the apparatus of the present disclosure moving along a field where no skew is detected by the skew detecting device.

FIGS. 1-6 schematically illustrate an embodiment of a seeding apparatus 1 of the present disclosure comprising an implement frame 3 mounted on frame wheels 5 for travel in an operating travel direction, and a plurality of furrow openers 7 mounted on the implement frame 3. A primary air seeder cart 9 is mounted on cart wheels 11 on each side, and is pivotally connected about a substantially vertical implement pivot axis IPA to an implement hitch 13 mounted on the implement frame 3. An implement pivot limiting system ILS is operative to limit a degree of pivoting of the primary air seeder cart 9 about the implement pivot axis IPA with respect to the implement frame 3 to a selected degree chosen to reduce bending of conduits.

As shown in FIGS. 1-4 the implement pivot limiting system ILS is provided by an actuator 17 and a pivot control 15 that is operative to selectively activate the actuator 17 to pivot the primary air seeder cart 9 to the right or the left with respect to the implement frame 3.

Figure 2:
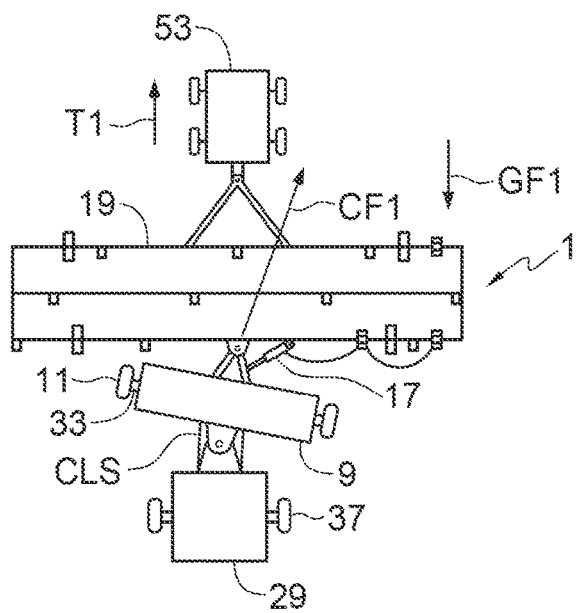
FIG. 2 is a schematic top view of the embodiment of FIG. 1 where the implement is connected to a tractor and is moving along a field where a skewing force is detected tending to skew the implement frame in a first direction.
Figure 2A:
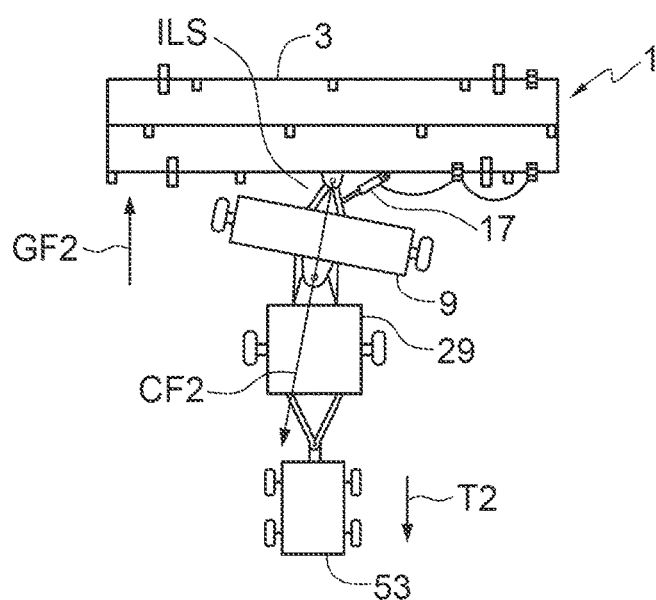
FIG. 2A is a schematic top view of the embodiment of FIG. 1 where the secondary air seeder cart is connected to a tractor and is moving along a field where a skewing force is detected tending to skew the implement frame in a first direction.
Figure 3:
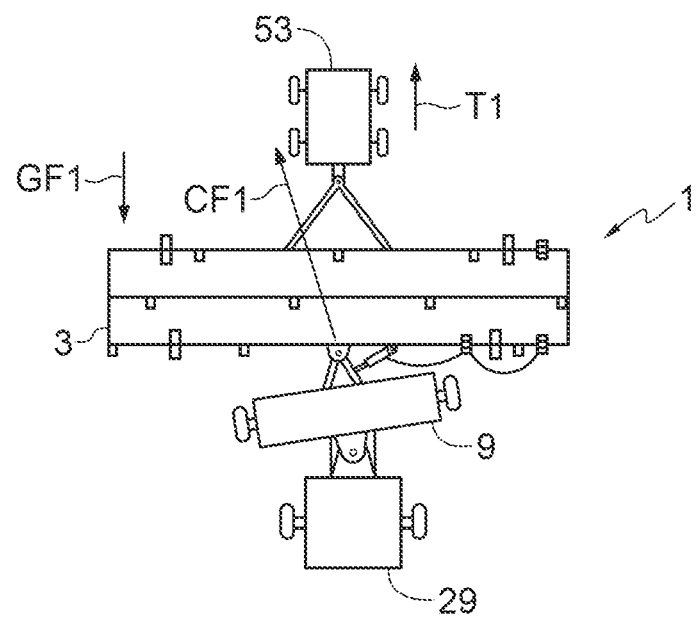
FIG. 3 is a schematic top view of the embodiment of FIG. 1 where the implement is connected to a tractor and is moving along a field where a skewing force is detected tending to skew the implement frame in an opposite second direction.
Figure 3A:
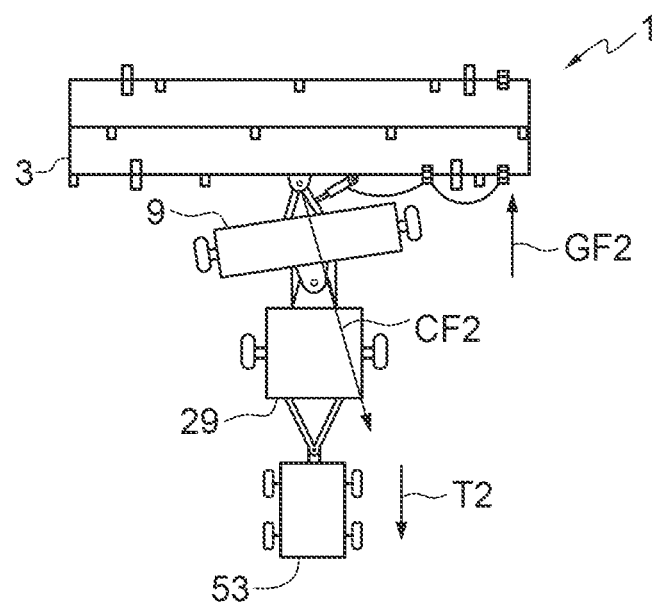
FIG. 3A is a schematic top view of the embodiment of FIG. 1 where the secondary air seeder cart is connected to a tractor and is moving along a field where a skewing force is detected tending to skew the implement frame in an opposite second direction.

The apparatus 1 can be configured as a tow behind cart, where the primary air seeder cart 9 is pulled behind the implement frame 3 in direction T1 as shown in FIGS. 2 and 3, or as a tow between cart, where the implement frame 3 is pulled behind the primary air seeder cart 9 in direction T2 as shown in FIGS. 2A and 3A.

FIG. 1 schematically illustrates the apparatus 1 moving along a field in either direction T1 or T2 where the forces on the implement frame 3 are substantially the same on each side of the implement frame 3, and the actuator 17 is in a neutral position. In this situation the pivot control 15 may be moved to a float position where the actuator 17 exerts no force.

FIG. 2 schematically illustrates the implement frame 3 connected to a tractor 53 and moving in direction T1 and in a situation where, due to sidehill terrain or the like, the forces on the implement frame 3 are uneven and the balance of the forces on the implement frame 3 results in a ground force GF1 which will tend to move the implement frame 3 to a skewed orientation where the implement frame 3 moves in direction T1 with the lateral frame members 19 oriented at an angle to the operating travel direction T1.

A skew detecting device 21 is provided by a pair of GPS sensors, or a pair of cameras, or like skew detectors as are known in the art. Instead of two GPS sensors on the implement frame 3, it is typical as well to have a GPS sensor on the tractor 53 which can serve as one of the GPS sensors along with the sensor on the rear of the implement frame 3. Similarly a camera on the tractor may be used to follow the crop rows from a prior year to determine, along with the camera on the rear of the implement frame 3, whether skewing is occurring. Similarly it is also known to have skew detecting devices that are in direct contact with the ground.

In any event the skew detecting device 21 determines when the implement frame 3 is travelling in this skewed orientation, and sends a correction signal to the pivot control 15, and the pivot control 15 activates the actuator 17 in response to the correction signal to correct the skewed orientation. Where, as shown in FIG. 2, the resultant ground force GF1 is on the right with the apparatus 1 moving in direction T1 the actuator 17 extends, pivoting the primary air seeder cart 9 to the left side so that the cart wheels 11 roll along the ground in direction CF1 and so exert a corresponding cart force that pushes the implement hitch 13 to the right and overcomes the ground force GF1 and the implement frame moves in direction T1 in the proper orientation perpendicular to the direction T1.

Similarly in FIG. 2A the secondary air seeder cart 29 is connected to the tractor 53 and moving in direction T2 and in a situation where, again due to sidehill terrain or the like, the forces on the implement frame 3 are uneven and the balance of the forces on the implement frame 3 results in a ground force GF2 which will tend to move the implement frame 3 to a skewed orientation where the implement frame 3 moves in direction T2 with the lateral frame members 19 oriented at an angle to the operating travel direction T2.

Where as shown in FIG. 2A where the resultant ground force GF2 is on the right with the apparatus 1 moving in direction T2 the actuator 17 again extends, pivoting the primary air seeder cart 9 to the right side so that the cart wheels 11 roll along the ground in direction CF2 and so exert a corresponding cart force that pushes the implement hitch 13 to the right and overcomes the ground force GF2 and the implement frame 3 moves in the proper orientation perpendicular to the direction T2.

FIGS. 3 and 3A illustrate the same forces GF1, GF2 on the opposite sides of the implement frame 3 with the actuator 17 retracted and the primary air seeder cart 9 pivoted to the opposite side of the implement pivot axis IPA and the cart wheels 11 rolling along the ground in direction CF1, CF2. The degree of pivoting will depend on the uneven ground forces encountered and the resulting degree of skew which are determined by the skew detecting device 21.

Figure 4:
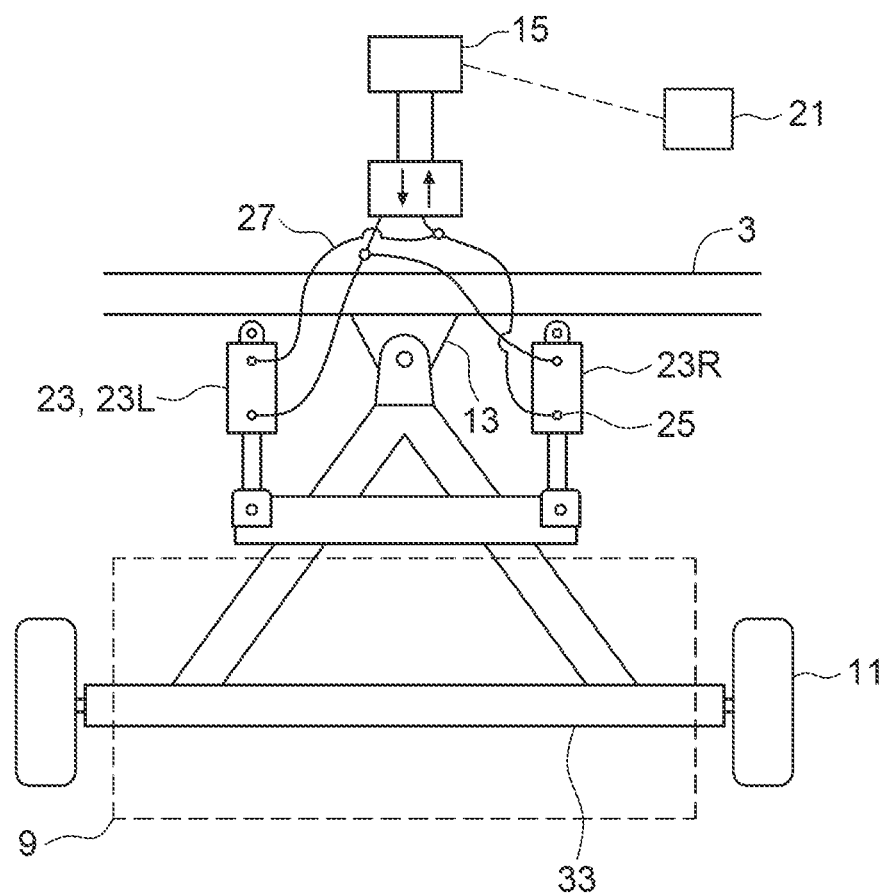
FIG. 4 is a schematic top view showing two hydraulic cylinders acting together to control skew.

FIG. 4 schematically illustrates an apparatus where the actuator 17 is provided by right and left hydraulic cylinders 23R, 23L, and where the pivot control 15 is operative to retract one of the right and left hydraulic cylinders 23R, 23L while extending the other. The pivot control 15 is operative to provide pressurized hydraulic fluid to each of the right and left hydraulic cylinders 23R, 23L at a pivot pressure sufficient to pivot the primary air seeder cart 9 with respect to the implement frame 3 in response to the correction signal. This is an active system with the pivot control 15 reading continuous correction signals from the skew detecting device 21 and extending or retracting the right and left hydraulic cylinders as required to maintain the proper orientation of the implement frame 3.

In order to slow down the response of the hydraulic cylinders 23 to the changing flow of hydraulic fluid to avoid fluctuations and undue stresses a restrictive orifice 25 can be placed inside the right and left hydraulic conduits 27 connecting the pivot control 15 to the corresponding right and left hydraulic cylinders 23.

The pivot pressure can be configured to permit the primary air seeder cart 9 to pivot with respect to the implement frame during a turn when the cart force CF overcomes the hydraulic pressure in the hydraulic cylinders 23R, 23L and extends or retracts the hydraulic cylinders to make the turn. The pivot control 15 can also be configured to reduce the pivot pressure when the furrow openers 7 are raised above the ground, such during a headland turn.

The actuator 17 serves as the implement pivot limiting system ILS that limits the degree of pivot of the primary air seeder cart 9 to the right or left of the implement frame 3 to a selected degree. This may be desirable in some situations, for example to avoid damage to hoses passing from the primary air seeder cart 9 to the furrow openers 7.

The illustrated seeding apparatus 1 also discloses a secondary air seeder cart 29 connected to a cart hitch 31 on the primary air seeder cart 9 about a substantially vertical cart pivot axis CPA. The primary air seeder cart 9 is supported on a primary axle 33 with the wheels 11 on each end, and similarly the secondary air seeder cart 29 is supported on a secondary axle 35 with wheels 37 on each end and the tanks on each are configured to be generally centered on the axles 33, 35. The hitch weight exerted by the primary air seeder cart 9 on the implement hitch 13 is generally less than 20% of the total weight of the primary air seeder cart 9, and similarly the hitch weight exerted by the secondary air seeder cart 29 on the cart hitch 31 is generally less than 20% of the total weight of the secondary air seeder cart 29.

Figure 7:
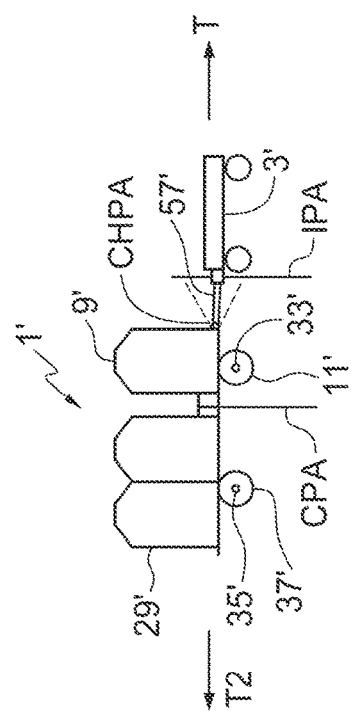
FIG. 7 is a schematic side view of an alternate embodiment where the secondary air seeder cart is fixed vertically with respect to primary air seeder cart.

FIG. 7 schematically illustrates an alternate apparatus 1' where wherein the primary air seeder cart 9' is supported on a primary axle 33' and the secondary air seeder cart 29' is supported on a secondary axle 35, and the secondary air seeder cart 29' is vertically fixed with respect to the primary air seeder cart 29' about the cart hitch pivot axis CHPA. A primary cart hitch 57 is pivotally attached to the primary air seeder cart 29' about a substantially horizontal cart hitch pivot axis CHPA oriented substantially perpendicular to the operating travel direction T1 or T2 and then is attached to the implement frame 3' about the implement pivot axis IPA. Thus the primary and secondary air seeder cart 9', 29' form a unit which can stand on its own four wheels 11', 37' and be conveniently detached from the implement frame if desired.

Figure 5:
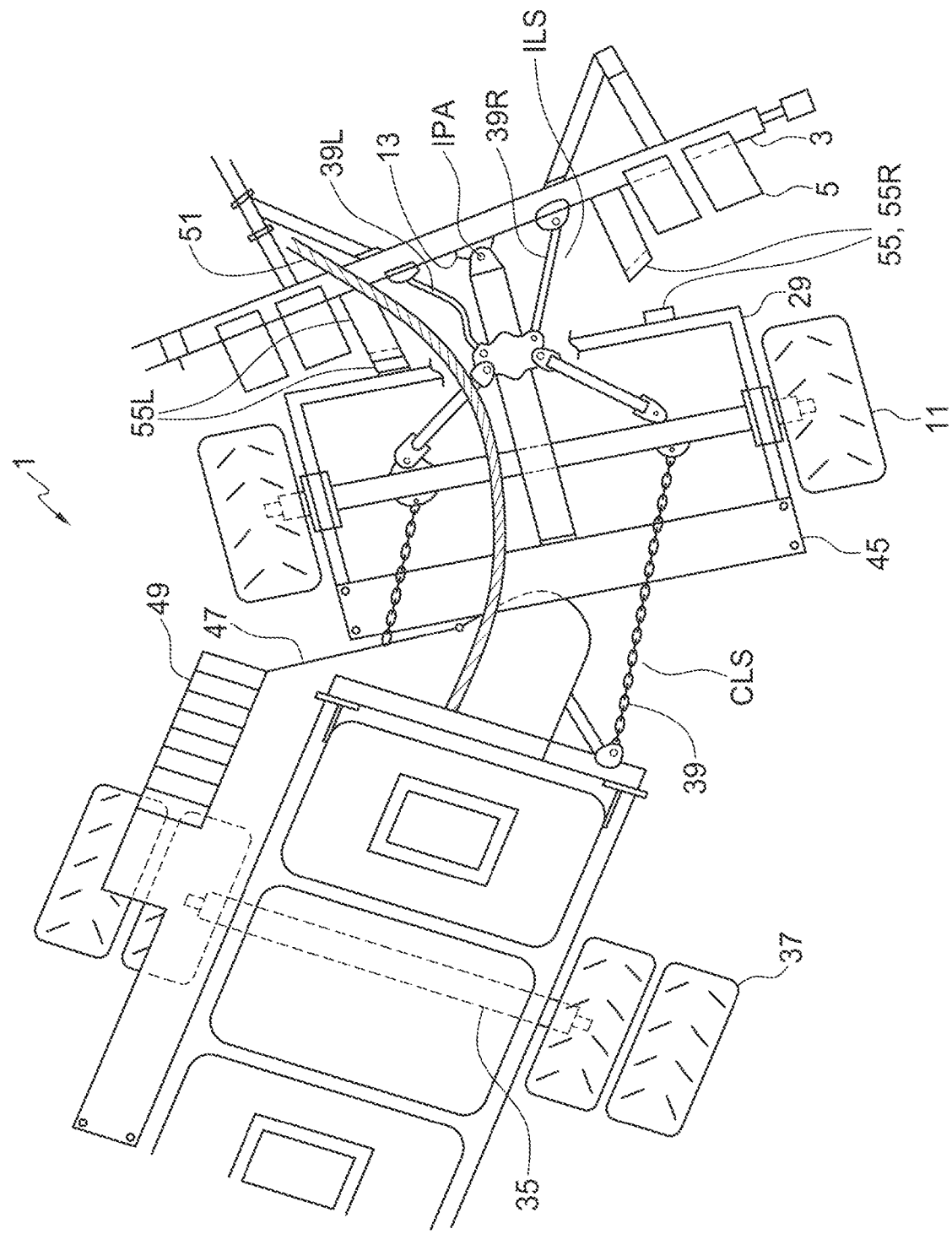
FIG. 5 is a side view of the embodiment of FIG. 1 showing the primary and secondary walkways, and also showing a tether providing the implement pivot limiting system.
Figure 6:
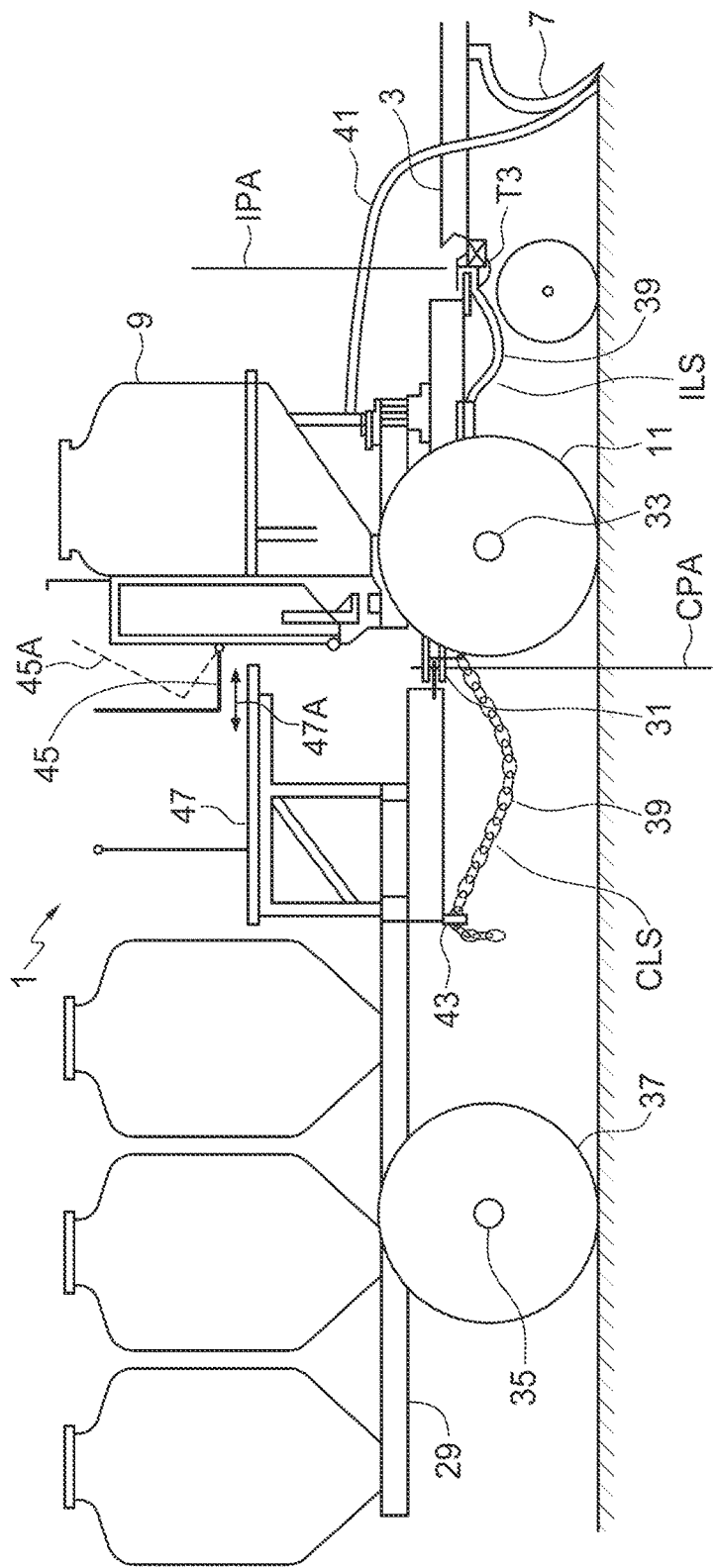
FIG. 6 is a top view of the embodiment of FIG. 1 showing the primary and secondary walkways, and also showing a tether or stops providing the implement pivot limiting system.

As shown in FIGS. 5 and 6 a cart pivot limiting system CLS is provided by tethers 39 and is operative to also limit the degree of pivoting of the secondary air seeder cart 29 about the cart pivot axis CPA to a selected degree. The apparatus 1 thus provides an articulated air seeder cart comprising the primary air seeder cart 9 and the secondary air seeder cart 29 where the secondary hoses 51 carrying various air entrained agricultural products from the secondary air seeder cart 29 pass to the primary air seeder cart 9 over a limited arc at the cart pivot axis CPA provided by the tethers 39 and therefore the amount of bending is reduced at that point.

These secondary hoses then pass under the primary air seeder cart 9 and must bend again when passing over the implement pivot axis IPA to the furrow openers 7 on the implement frame 3, or to manifolds and the like distributed across the implement frame 3. This angle is again limited by the implement pivot limiting system provided by the actuator 17 or by an alternate tethers 39 or stops 55 as shown in FIGS. 5 and 6. In some systems there is a furrow opener conduit 41 connected from each furrow opener 7 to the primary cart 9. Bending of these considerable number of conduits 41 is reduced by the implement pivot limiting system.

As shown in FIGS. 5 and 6 the implement and cart pivot limiting systems comprises right and left tethers 39R, 39L configured such that the right and left tethers 39 are loose when the implement frame 3 is moving in the operating travel direction as seen in FIG. 6, and such that turning the implement frame 3 tightens one of the tethers 39. The length of the tethers 39 can be adjusted, for example, by engaging a hook 43 into one of the links of a chain tether 39.

The implement or cart pivot limiting systems ILS, CLS can also be provided by right and left angle stops 55 configured such that during a turn to the left as shown in FIG. 5, the left angle stops 55L come together and prevent further pivoting about the implement pivot axis IPA, and configured such that during a turn to the right, the right angle stops 55R come together and prevent further pivoting about the implement pivot axis IPA. A position of the right and left angle stops is adjustable to adjust a degree of pivoting about the implement pivot axis IPA by moving same in and out.

A primary walkway 45 facilitates access to tanks on the primary air seeder cart 9, and a secondary walkway 47 facilitates access to tanks on the secondary air seeder cart 29, and the primary walkway 45 is accessible from the secondary walkway 47, and comprising a ladder 49 providing access to the secondary walkway 47. In the illustrated apparatus 1 the primary walkway 45 is above the secondary walkway 47 to allow for one to tilt with respect to the other in uneven terrain.

The secondary walkway 47 also extends somewhat under the primary walkway 45. The primary walkway 45 is also pivotally attached to the primary air seeder cart 9 and is movable to a stored position 45A. The secondary walkway 47 may also telescope under the primary walkway as indicated by the arrows 47A.

With the present apparatus 1 the primary and secondary air seeder cart 9, 29 are towed behind the implement frame 3 and the implement frame 3 is connected to a tractor 53 as seen in FIGS. 2 and 3, or the primary and secondary air seeder carts 9, 29 are towed in front of the implement frame 3 and the secondary air seeder cart 29 is connected to the tractor 53 as seen in FIGS. 2A and 3A.

The present disclosure provides a skew correction system for a seeding implement that is simple and can be readily adapted to various air seeder carts. The disclosure also provides an articulated air seeder cart with primary and secondary air seeder cart 9, 29. The apparatus allows a tank with a significant number of seed conduits, such as one for each furrow opener, to be mounted on an air seeder cart close to the implement with little pivotal movement instead of being mounted on the implement frame. The walkways 45, 47 giving access to tanks on both the primary and secondary air seeder carts 9, 29 are accessible from a single ladder, reducing effort for the operator.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:
1. A seeding apparatus comprising:
   an implement frame mounted on wheels for travel in an operating travel direction, and a plurality of furrow openers mounted on the implement frame;
   a primary air seeder cart pivotally connected about a substantially vertical implement pivot axis to an implement hitch mounted on the implement frame; and
   an implement pivot limiting system operative to limit a degree of pivoting of the primary air seeder cart about the implement pivot axis with respect to the implement frame to a selected degree chosen to reduce bending of conduits, wherein the implement pivot limiting system comprises a pivot control configured to selectively activate an actuator to pivot the primary air seeder cart to the right and/or the left with respect to the implement frame, and wherein the pivot control is configured to be movable to a float position where the actuator exerts no force.

2. The apparatus of claim 1 the implement pivot limiting system is operative to limit a degree of pivoting of the primary air seeder cart about the implement pivot axis with respect to the implement frame to an adjustable degree.

3. The apparatus of claim 1 further comprising a skew detecting device operative to determine when the implement frame is travelling in a skewed orientation at a non-perpendicular angle to the operating travel direction, and operative to send a correction signal to the pivot control, and wherein the pivot control is operative to activate the actuator in response to the correction signal to correct the skewed orientation.

4. The apparatus of claim 1 wherein the actuator is provided by right and left hydraulic cylinders, and wherein the pivot control is operative to retract one of the right and left hydraulic cylinders while extending the other of the right and left hydraulic cylinders.

5. The apparatus of claim 1 wherein a pivot pressure is configured to permit the primary air seeder cart to pivot with respect to the implement frame during a turn.

6. The apparatus of claim 1 wherein the pivot control is configured to reduce a pivot pressure when the plurality of furrow openers are raised above the ground.

7. The apparatus of claim 1 comprising right and left hydraulic conduits connecting the pivot control to the corresponding right and left hydraulic cylinders, and comprising a restrictive orifice in at least one of the right and left hydraulic conduits.

8. The apparatus of claim 1 comprising a secondary air seeder cart connected to a cart hitch on the primary air seeder cart about a substantially vertical cart pivot axis.

9. The apparatus of claim 8 comprising a primary walkway facilitating access to primary tanks on the primary air seeder cart, and a secondary walkway facilitating access to secondary tanks on the secondary air seeder cart, and wherein the primary walkway is accessible from the secondary walkway, and comprising a ladder providing access to one of the primary and secondary walkways.

10. The apparatus of claim 8 wherein the primary and secondary air seeder cart are towed behind the implement frame and the implement frame is connected to a tractor, or wherein the primary and secondary air seeder cart are towed in front of the implement frame and the secondary air seeder cart is connected to the tractor.

11. A seeding apparatus comprising:
an implement frame mounted on wheels for travel in an operating travel direction, and a plurality of furrow openers mounted on the implement frame;
a primary air seeder cart pivotally connected to an implement hitch on the implement frame about a substantially vertical implement pivot axis;
a secondary air seeder cart pivotally connected to a cart hitch on the primary air seeder cart about a substantially vertical cart pivot axis;
an implement pivot limiting system operative to limit the degree of pivoting of the primary air seeder cart about the implement pivot axis with respect to the implement frame to a selected degree.

12. The apparatus of claim 11 comprising a cart pivot limiting system operative to limit the degree of pivoting of the secondary air seeder cart about the cart pivot axis to a selected degree.

13. The apparatus of claim 11 comprising a furrow opener conduit connected from each furrow opener to the primary cart.

14. The apparatus of claim 11 wherein the implement pivot limiting system comprises right and left tethers configured such that the right and left tethers are loose when the implement frame is moving in the operating travel direction, and such that turning the implement frame tightens one of the right and left tethers.

15. The apparatus of claim 14 wherein a length of the right and left tethers is adjustable.

16. The apparatus of claim 11 wherein the implement pivot limiting system comprises right and left angle stops configured such that during a turn to the left, the left angle stops come together and prevent further pivoting about the implement pivot axis, and configured such that during a turn to the right, the right angle stops come together and prevent further pivoting about the implement pivot axis.

17. The apparatus of claim 16 wherein a position of the right and left angle stops is adjustable to adjust a degree of pivoting about the implement pivot axis.

18. The apparatus of claim 11 wherein the implement pivot limiting system comprises a hydraulic cylinder.

19. The apparatus of claim 18 wherein the implement pivot limiting system comprises right and left hydraulic cylinders, and wherein the selected degree of pivoting is dictated by a length of the right and left hydraulic cylinders.

20. The apparatus of claim 18 comprising a skew detecting device operative to determine when the implement frame is travelling in a skewed orientation at a non-perpendicular angle to the operating travel direction, and operative to send a correction signal to a pivot control, and wherein the pivot control is operative to extend or retract the right and left hydraulic cylinders in response to the correction signal to correct the skewed orientation.

21. The apparatus of claim 20 wherein the pivot control is operative to provide pressurized hydraulic fluid to each of the right and left hydraulic cylinders at a pivot pressure sufficient to pivot the primary air seeder cart with respect to the implement frame in response to the correction signal.

22. The apparatus of claim 21 wherein the pivot pressure is configured to permit the primary air seeder cart to pivot with respect to the implement frame during a turn.

23. The apparatus of claim 21 wherein the pivot control is configured to reduce the pivot pressure when the furrow openers are raised above the ground.

24. The apparatus of claim 11 and wherein a hitch weight exerted by the primary air seeder cart on the implement hitch is less than 20% of the total weight of the primary air seeder cart, and wherein a hitch weight exerted by the secondary air seeder cart on the cart hitch is less than 20% of the total weight of the secondary air seeder cart.

25. The apparatus of claim 11 wherein the primary air seeder cart is supported on a primary axle and the secondary air seeder cart is supported on a secondary axle, and the secondary air seeder cart is vertically fixed with respect to the primary air seeder cart about the cart pivot axis, and a primary cart hitch is pivotally attached to the primary air seeder cart about a substantially horizontal cart hitch pivot axis oriented substantially perpendicular to the operating travel direction.

26. The apparatus of claim 11 comprising a primary walkway facilitating access to tanks on the primary air seeder cart, and a secondary walkway facilitating access to tanks on the secondary air seeder cart, and wherein the primary walkway is accessible from the secondary walkway, and comprising a ladder providing access to one of the primary and secondary walkways.

27. The apparatus of claim 26 wherein one of the primary and secondary walkways is above the other of the primary and secondary walkways.

28. The apparatus of claim 26 wherein one of the primary and secondary walkways:
- extends under the other of the primary and secondary walkways; or
- is pivotally attached to the corresponding air seeder cart and is movable to a stored position; or
- is telescopically attached to the corresponding air seeder cart.

29. The apparatus of claim 11 wherein the primary and secondary air seeder cart are towed behind the implement frame and the implement frame is connected to a tractor, or wherein the primary and secondary air seeder cart are towed in front of the implement frame and the secondary air seeder cart is connected to the tractor.

\* \* \* \* \*